(12) United States Patent
Chen

(10) Patent No.: US 7,149,098 B1
(45) Date of Patent: Dec. 12, 2006

(54) OVER-POWER PROTECTION APPARATUS WITH PROGRAMMABLE OVER-CURRENT THRESHOLD

(75) Inventor: Tso-Min Chen, Taichung (TW)

(73) Assignee: System General Corporation, Taipei Hsien (TW)

( * ) Notice: Subject to any disclaimer, the term of this patent is extended or adjusted under 35 U.S.C. 154(b) by 0 days.

(21) Appl. No.: 11/324,324

(22) Filed: Jan. 4, 2006

(51) Int. Cl.
*H02H 7/122* (2006.01)

(52) U.S. Cl. ............................... 363/56.09; 363/21.13; 361/79; 361/93.8; 323/285

(58) Field of Classification Search .................. 363/20, 363/21.01, 21.04, 21.12, 56.01, 56.09, 56.11, 363/97, 131; 361/18, 79, 86, 87, 90, 91.1, 361/93.8, 93.9; 323/282–285
See application file for complete search history.

(56) References Cited

U.S. PATENT DOCUMENTS

| | | | | |
|---|---|---|---|---|
| 4,628,429 A | * | 12/1986 | Walker | 363/21.08 |
| 4,685,040 A | * | 8/1987 | Steigerwald et al. | 363/17 |
| 5,029,269 A | * | 7/1991 | Elliott et al. | 363/21.1 |
| 5,134,537 A | * | 7/1992 | Buss et al. | 361/154 |
| 5,615,093 A | * | 3/1997 | Nalbant | 363/25 |
| 6,088,207 A | * | 7/2000 | Sugiura et al. | 361/91.2 |
| 6,100,677 A | * | 8/2000 | Farrenkopf | 323/285 |
| 6,690,591 B1 | * | 2/2004 | Min | 363/97 |
| 6,906,934 B1 | * | 6/2005 | Yang et al. | 363/49 |
| 7,071,630 B1 | * | 7/2006 | York | 315/224 |

* cited by examiner

*Primary Examiner*—Gary L Laxton
(74) *Attorney, Agent, or Firm*—Rosenberg, Klein & Lee

(57) ABSTRACT

An over-power protection apparatus with programmable over-current threshold for a power converter is provided. The over-power protection apparatus further provides an over-temperature threshold for protection purposes. The over-power protection apparatus is able to achieve over-power and over-temperature protection in response to the level of the driving signal of the power converter. In addition, the programmable over-current threshold of the present invention can be adjusted in response to various load conditions.

11 Claims, 5 Drawing Sheets

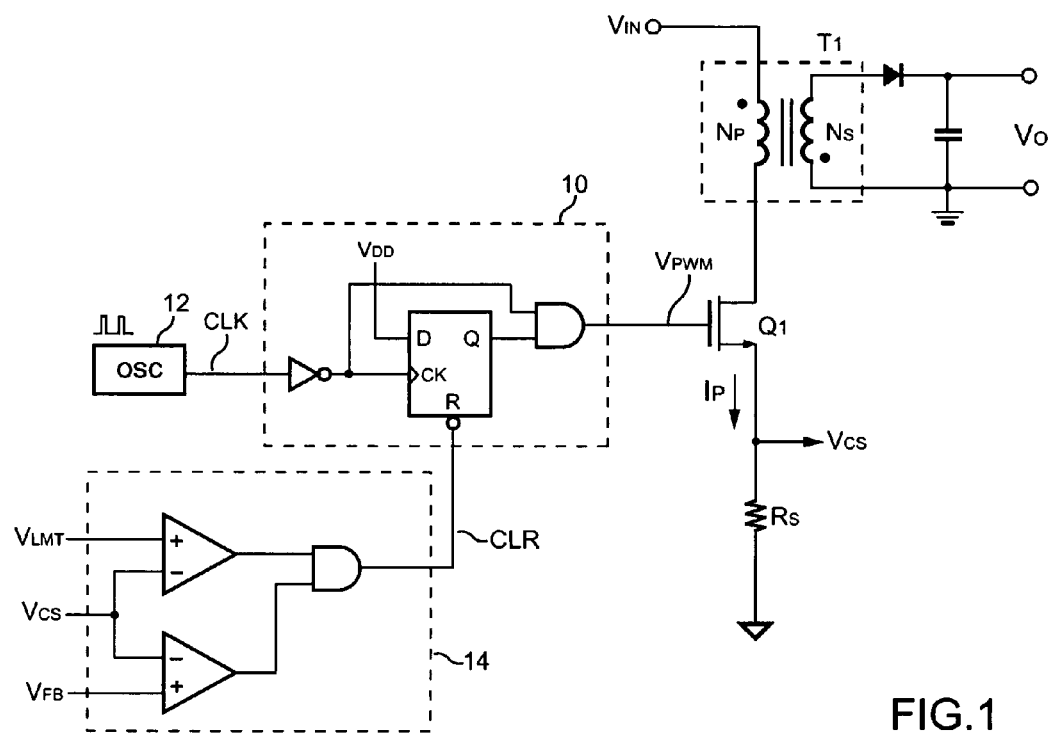
FIG.1
(PriorArt)

OVER-POWER PROTECTION APPARATUS WITH PROGRAMMABLE OVER-CURRENT THRESHOLD

BACKGROUND OF THE INVENTION

1. Field of the Invention

The present invention relates to an over-power protection apparatus, and more particular to an over-power protection apparatus used in a power supply for programming an over-current threshold.

2. Description of Related Art

Various power converters have been widely used to provide a regulated output voltage and current. For the sake of safety reasons, an over-power protection means must be provided to protect both the power converter itself and the power system. A limited power output is thus required for the power converter during the conditions for overloading, short-circuit and feedback open-loop.

Referring to FIG. 1 for the circuit diagram of a prior art power converter, the power converter comprises a transformer $T_1$, a control unit 14, a driving unit 10, an oscillator 12, a current sense resistor $R_S$, and a power switch $Q_1$. The output terminal of the power converter can obtain a voltage feedback signal $V_{FB}$. A current sense signal $V_{CS}$ is produced by a primary switching current $I_P$ of the transformer $T_1$ through a current sense resistor $R_S$. The control unit 14 receives the current sense signal $V_{CS}$, a maximum power signal $V_{LMT}$, and the voltage feedback signal $V_{FB}$. The clear signal CLR outputted by the control unit 14 is generated when the current sense signal $V_{CS}$ is higher than the maximum power signal $V_{LMT}$ or the voltage feedback signal $V_{FB}$. The driving unit 10 receives a pulse signal CLK outputted by the oscillator 12 and a clear signal CLR outputted by the control unit 14 for controlling the driving unit 10 to periodically disable the driving signal $V_{PWM}$. Therefore, the output of the power converter is regulated, and the primary switching current $I_P$ of the transformer $T_1$ and the maximum output power are limited further.

In practical application, the power converter is used in printers and scanners having a motor load that must provide a peak power for a short period. In other words, the peak power greater than the over-current threshold is permitted within a predetermined period to meet a larger output power and a starting torque for the motor load needed. The peak power is always equal to several times of the maximum output power, such that the power switch and the other power devices must increase the voltage and current stresses, and thus increasing the cost. Therefore, it is an important to provide an appropriate protection and to avoid an erroneous judgment for the power converter. Since the pin number in the integrated circuit is limited to satisfy the commercial specification, therefore the peak power is usually set to a constant value according to the load requirement, and there is no additional pin to adjust the over-current threshold. Such power converter is provided for a specific load, but it is not applicable for a common use in the industry application.

SUMMARY OF THE INVENTION

In view of the foregoing shortcomings, the over-power protection apparatus used in a power supply for programming an over-current threshold provides a peak power adjusted according to a load requirement. The circuit according to a first preferred embodiment of the present invention comprises an oscillator for outputting a pulse signal. A control unit generates a clear signal once the current sense signal exceeds a maximum power threshold. A driving unit outputs a driving signal for controlling the driving unit to periodically disable the driving signal in response to the clear signal. A threshold unit generates a current limit signal in response to the driving signal is in high-level. An over-power comparative unit outputs a protection signal once the current sense signal is higher than the current limit signal. An accumulating trigger unit accumulates and counts the protection signal, and further generates a first off-signal as the protection signal is enabled and the count of the protection signal reaches a predetermined value. A latch unit generates a latch signal to latch and stop outputting the driving signal in response to the first off-signal, so as to achieve the over-power protection.

Compared with the first preferred embodiment of the present invention, the second preferred embodiment further comprises an over-temperature protection unit and a connecting unit. The over-temperature protection unit generates a second off-signal for indicating an over-temperature status in response to the low-level of the driving signal. The connecting unit is used to latch the driving signal for the power converter in response to the second off-signal or the first off-signal.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein:

FIG. 1 shows a circuit diagram of a conventional power converter;

DETAILED DESCRIPTION OF THE PREFERRED EMBODIMENTS

Figure 2:
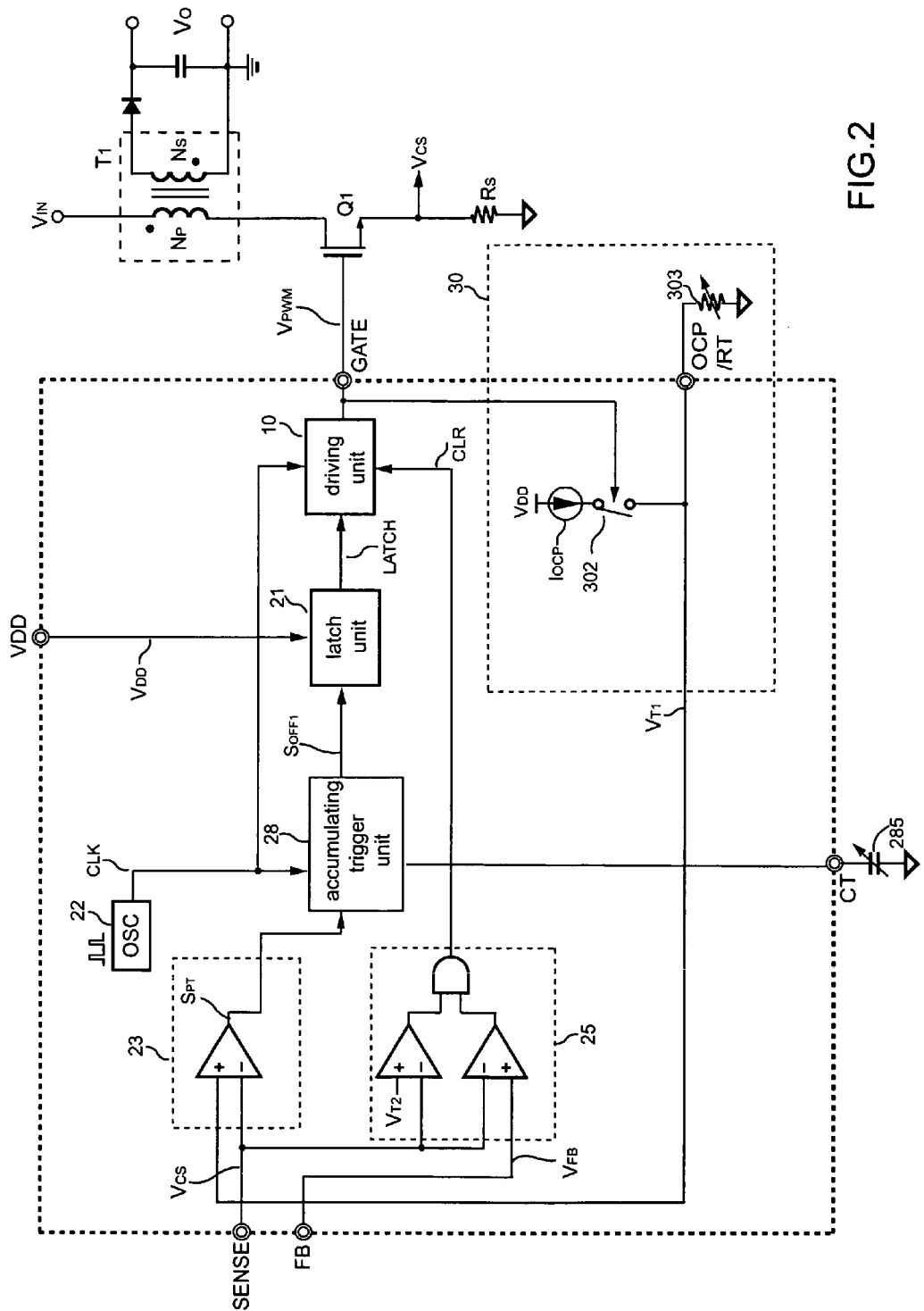
FIG. 2 shows a first preferred embodiment of a schematic diagram of the power converter according to the present invention.

FIG. 2 shows a first preferred embodiment of a schematic diagram of a power converter according to the present invention. The first preferred embodiment comprises an oscillator 22 for outputting a pulse signal CLK. A control unit 25 receives a current sense signal $V_{CS}$, a voltage feedback signal $V_{FB}$, and a maximum power signal $V_{T2}$ for generating a clear signal CLR in a low-level once the current sense signal $V_{CS}$ is higher than the maximum power signal $V_{T2}$ or the voltage feedback signal $V_{FB}$. A driving unit 10 is connected to an oscillator 22 and a control unit 25 for receiving the pulse signal CLK to output a driving signal $V_{PWM}$, and adjusting a pulse width of the driving signal $V_{PWM}$ once the clear signal CLR in low-level is produced.

A threshold unit 30 is connected to the driving unit 10 for outputting a current limit signal $V_{T1}$ in response to the driving signal $V_{PWM}$ is in high-level. The threshold unit 30 comprises a programming resistor 303 connected to a first controlled switch 302 through a constant current source $I_{OCP}$ wherein the first controlled switch 302 is controlled by the driving signal $V_{PWM}$ in high-level. The current limit signal $V_{T1}$ is generated by the voltage across the programming resistor 303 through the constant current source $I_{OCP}$. The programming resistor 303 can be adjusted to create the current limit signal $V_{T1}$ in response to the different load requirement.

An over-power comparative unit 23 is connected to a threshold unit 30 for receiving the current limit signal $V_{T1}$ and the current sense signal $V_{CS}$. The over-power comparative unit 23 generates a logic low state at a protection signal $S_{PT}$ once the current sense signal $V_{CS}$ is higher than the current limit signal $V_{T1}$. An accumulating trigger unit 28 is connected to the over-power comparative unit 23 and the oscillator 22 for receiving the protection signal $S_{PT}$ and the pulse signal CLK, further accumulates and counts the protection signal $S_{PT}$. The accumulating trigger unit 28 generates a first off-signal $S_{OFF1}$ as the protection signal $S_{PT}$ is enabled and the count of the protection signal $S_{PT}$ reaches a predetermined value.

A latch unit 21 is connected to the accumulating trigger unit 28 and the driving unit 10 for outputting a latch signal LATCH to the driving unit 10 in response to the first off-signal $S_{OFF1}$ The driving unit 10 will stop outputting the driving signal $V_{PWM}$ to the power switch $Q_1$ to achieve the latch protection once the latch signal LATCH is enabled at the input of the driving unit 10. An electronic device coupled to the output terminal of the power converter cannot be operated properly as the power supply is latched and protected. The way of the latch unit 21 to carry out the latch protection is a prior art, and thus will not be described here. Since the first off-signal $S_{OFF1}$ is produced as the protection signal is enabled and the count of the protection signal reaches a predetermined, therefore the first preferred embodiment could provide an appropriate protection when the load requires a larger output power at a specific period.

Figure 3:
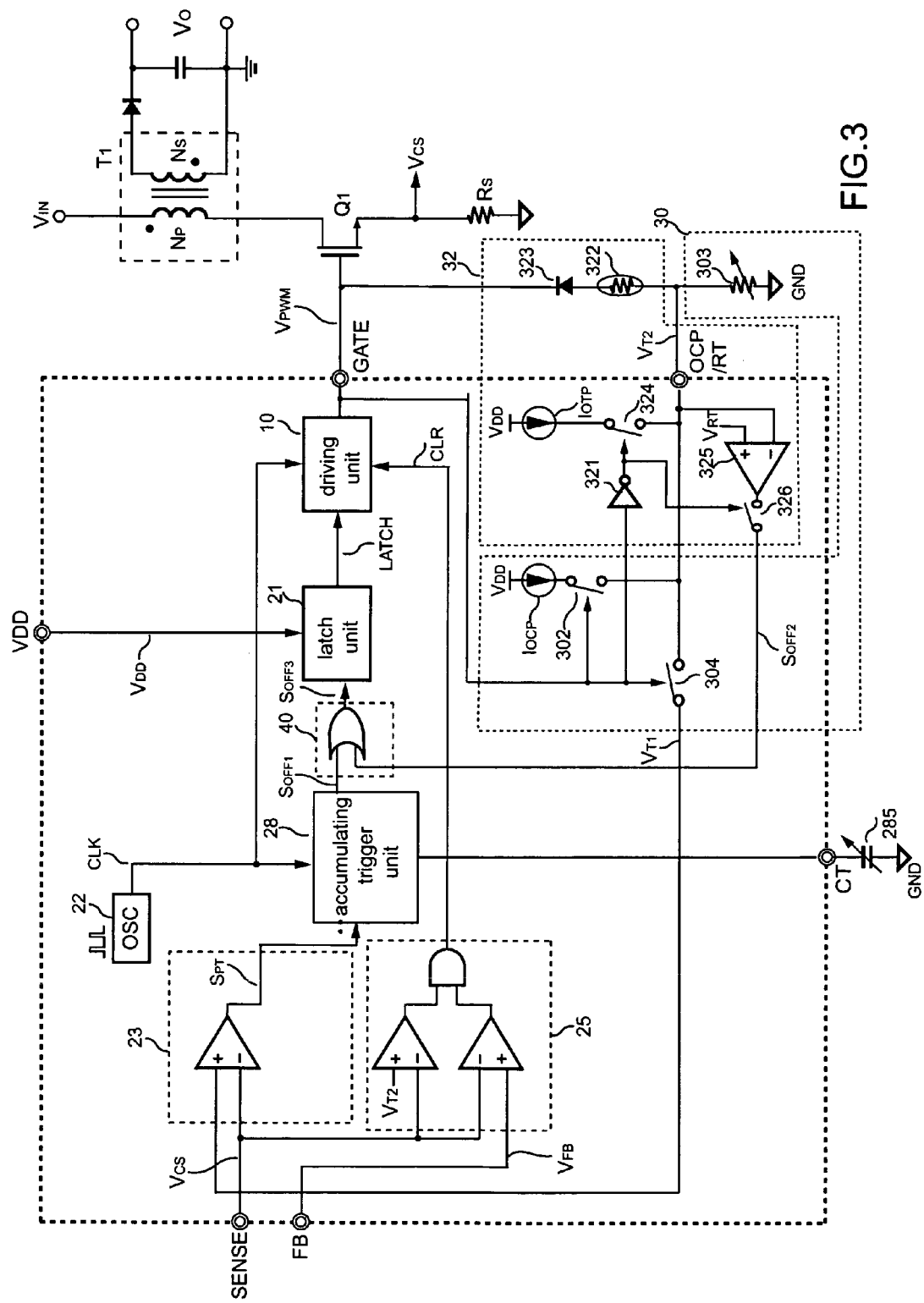
FIG. 3 shows a second preferred embodiment of a schematic diagram of the power converter according to the present invention.

FIG. 3 shows a second preferred embodiment of a schematic diagram of a power converter according to the present invention. The second preferred embodiment provides a current limit signal $V_{T1}$ as a current limit threshold under a logic high state at a driving signal $V_{PWM}$ to achieve an over-power protection and provides a thermal limit signal $V_{T3}$ as a thermal limit threshold under a logic low state at a driving signal $V_{PWM}$ to achieve an over-temperature protection. When the second preferred embodiment of the present invention is used in a power converter, the power converter can achieve the over-power and over-temperature protection under the normal operation.

Referring to FIGS. 2 and 3, the second preferred embodiment compared with the first preferred embodiment adds an over-temperature protection unit 32, a connecting unit 40 and a threshold unit 30. The operating principle and characteristics of the other circuits are the same as the first preferred embodiment. The differences from the first preferred embodiment are described as follows:

The over-temperature protection unit 32 includes a thermal sensor 322, a threshold diode 323, an over-temperature current source $I_{OTP}$, a second controlled switch 324, an inverter 321, a third controlled switch 326, and an over-temperature comparator 325. The thermal sensor 322 is connected to the driving unit 10 through the threshold diode 323 and connected to a ground terminal GND through the programming resistor 303. The over-temperature current source $I_{OTP}$ is connected between the programming resistor 303 and the thermal sensor 322 through the second controlled switch 324. In the meantime, the second controlled switch 324 is connected to the driving unit 10 through the inverter 321. An input terminal of the over-temperature comparator 325 is connected to the programming resistor 303 and the thermal sensor 322 and a connecting point of the second controlled switch 324. Another input terminal of the over-temperature comparator 325 receives an over-temperature threshold $V_{RT}$, and an output terminal of the over-temperature comparator 325 is connected to the connecting unit 40 through the third controlled switch 326. The third controlled switch 326 is connected to the driving unit 10 through the inverter 321.

When the driving unit 10 outputs a logic low at the driving signal $V_{PWM}$, the threshold diode 323, the second controlled switch 324, and the third controlled switch 326 are turned on, and a thermal limit signal $V_{T3}$ across the programming resistor 303 is produced by the over-temperature current source $I_{OTP}$. The over-temperature comparator 325 outputs a second off-signal $S_{OFF2}$ in high-level once the thermal limit signal $V_{T3}$ is lower than the over-temperature threshold $V_{RT}$. The thermal sensor 322 with a negative resistance is connected in parallel with the programming resistor 303 as the thermal sensor 322 senses a temperature rise, such that the thermal limit signal $V_{T3}$ across the programming resistor 303 is reduced to achieve the over-temperature protection.

The connecting unit 40 is connected to the over-temperature protection unit 32 and the accumulating trigger unit 28 for executing an or-gate operation and generating a third off-signal $S_{OFF3}$ in response to the second off-signal $S_{OFF2}$ and the first off-signal $S_{OFF1}$.

Referring to FIG. 3 for the second preferred embodiment of the present invention, the threshold unit 30 includes a constant current source $I_{OCP}$, a fourth controlled switch 304 and the programming resistor 303. The constant current source $I_{OCP}$ is connected to the fourth controlled switch 304 and the programming resistor 303 through the first controlled switch 302. The first controlled switch 302 and the fourth controlled switch 304 are controlled by the driving signal $V_{PWM}$ in high-level, such that a current limit signal $V_{T1}$ across the programming resistor 303 is generated by the constant current source $I_{OCP}$.

Figure 4:
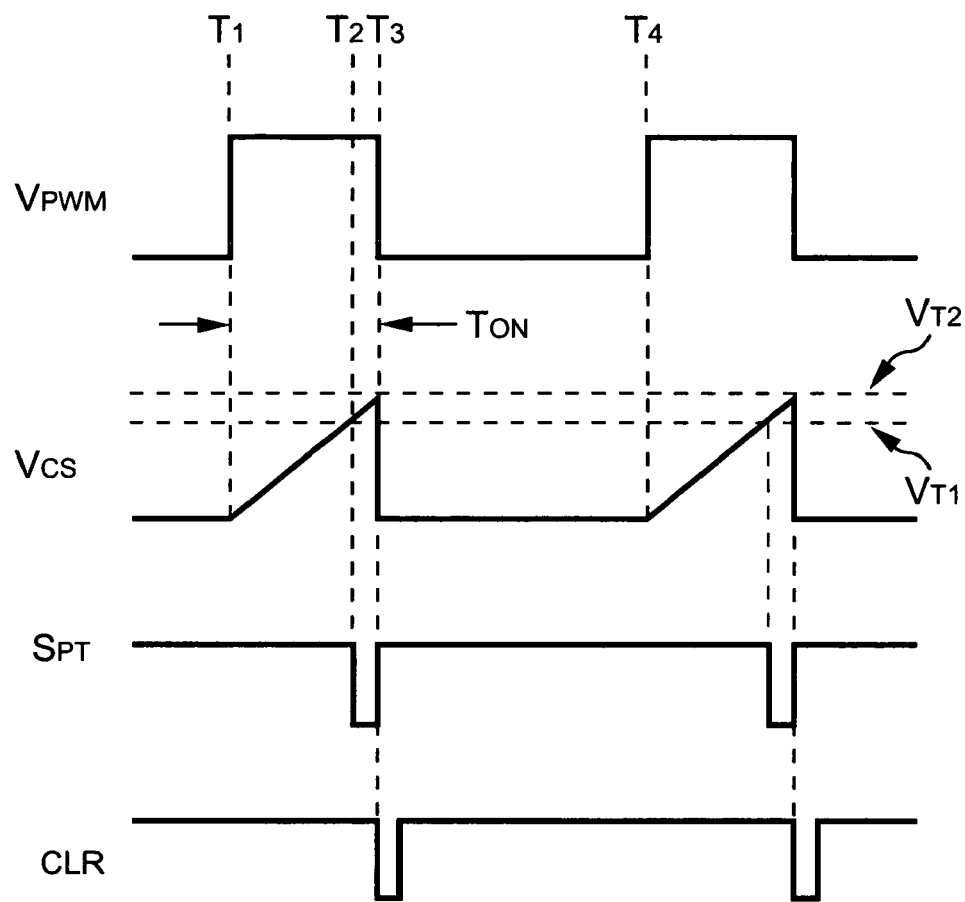
FIG. 4 shows the circuit waveforms of the power converter according to the present invention.

Referring to FIGS. 2 and 3, FIG. 4 shows the circuit waveforms of an over-power protection of the present invention. When the driving unit 10 outputs a logic high at the driving signal $V_{PWM}$, the power switch $Q_1$ is on state, and the current sense signal $V_{CS}$ will be increased from the time $T_1$. At the time $T_2$, the current sense signal $V_{CS}$ reaches the current limit signal $V_{T1}$, and the over-power comparative unit 23 outputs a protection signal $S_{PT}$ in low-level to the accumulating trigger unit 28. The accumulating trigger unit 28 starts accumulating and counting the protection signal $S_{PT}$ and prepares to latch the driving unit 10. At the time $T_3$, the current sense signal $V_{CS}$ reaches a maximum power signal $V_{T2}$, and the control unit 25 produces a logic low at a clear signal CLR to the driving unit 10, such that the driving signal $V_{PWM}$ is switched to a low-level (Time $T_3$~$T_4$) and further the driving signal of the power switch $Q_1$ is periodically disabled to achieve the protection purposes.

Figure 5:
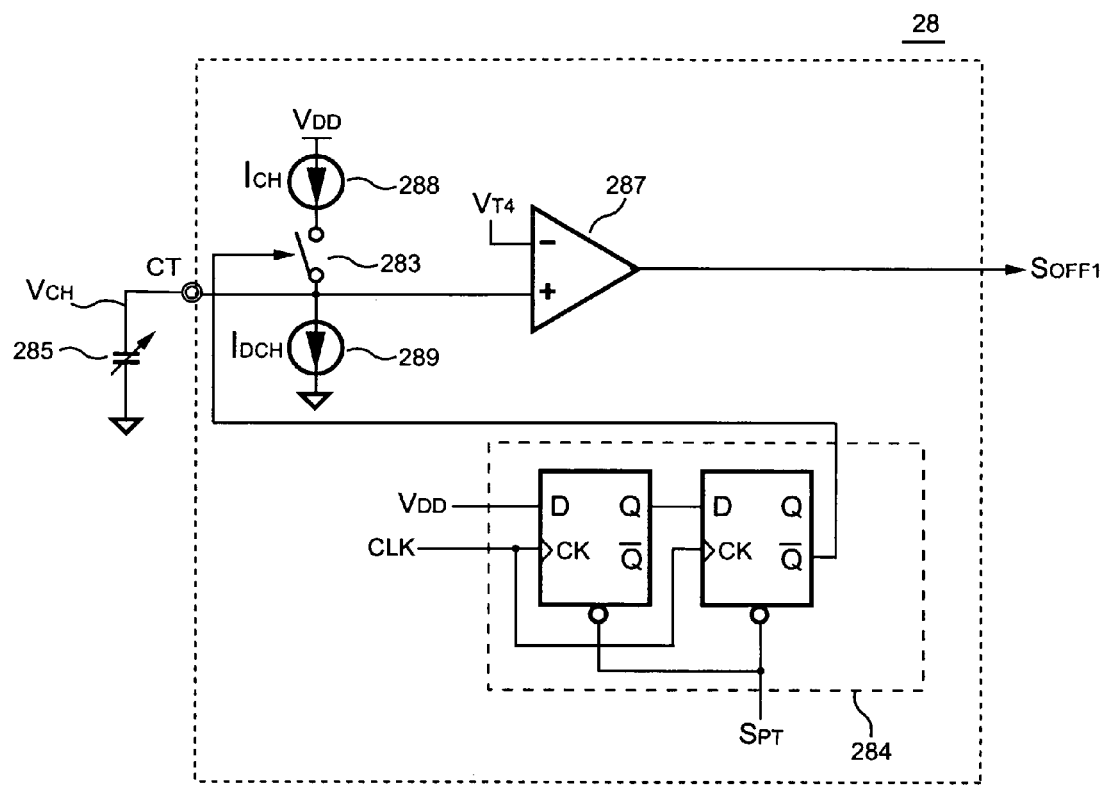
FIG. 5 shows a preferred embodiment of an accumulating trigger unit according to the present invention.

Referring to FIGS. 2 and 3, FIG. 5 shows a preferred embodiment of the accumulating trigger unit according to the present invention. The accumulating trigger unit 28 comprises a holding unit 284, a programmable capacitor 285, a switch 283, a charging current source 288, a discharging current source 289, and a delay comparator 287. To prevent the noise interference from the ground bounce or the switching spike, the holding unit 284 associated with the pulse signal CLK of the oscillator 22 are utilized to delay the state of the protection signal $S_{PT}$ for generating an up-down signal in high-level as the holding unit 284 receives the protection signal $S_{PT}$ in low-level produced by the over-power comparative unit 23, so that the switch 283 is on state.

The switch 283 is connected to the holding unit 284 for generating on/off state in response to the up-down signal outputted from the holding unit 284 and enabling of the protection signal $S_{PT}$. The programmable capacitor 285 is connected to a charging current source 288 through the switch 283 for generating a charging current $I_{CH}$ and a charging voltage $V_{CH}$ in response to the on state of the switch 283. A delay comparator 287 is coupled to the programmable capacitor 285 and a fourth threshold signal $V_{T4}$, which compare the charging voltage $V_{CH}$ with the fourth threshold signal $V_{T4}$ for generating the first off-signal $S_{OFF1}$ in high-level once the charging voltage $V_{CH}$ is higher than the fourth threshold signal $V_{T4}$.

On the contrary, the switch 283 can change the on state to the off state in response to the over-power comparative unit 23 stops producing the protection signal $S_{PT}$, and the holding unit 284 will down count and output a logic low at the up-down signal. Meanwhile, the charging voltage $V_{CH}$ across the programmable capacitor 285 starts to discharge via the discharging current source 289. The delay comparator 287 stops generating the first off-signal $S_{OFF1}$ once the charging voltage $V_{CH}$ is smaller than the fourth threshold signal $V_{T4}$. Therefore, the duration of the accumulating and counting, and the period of fault conditions are changed by adjusting the capacitance of the programmable capacitor 285, so as to prevent an inappropriate protection when the load requires a larger rated power in a specific period.

Referring to FIG. 2, the over-power protection apparatus for programming an over-current threshold at least comprises: a voltage feedback terminal (FB), a current sense terminal (SENSE), a voltage input terminal (VDD), a driving terminal (GATE), an over-power/over-temperature protection terminal (OCP/RT), and an adjustable delay time terminal (CT). Therefore, the current sense signal $V_{CS}$, voltage feedback signal $V_{FB}$, and supplied voltage $V_{DD}$ can be received by the current sense terminal, voltage feedback terminal, and power input terminal respectively. The programming resistor 303 and the programmable capacitor 285 are connected to the over-power/over-temperature protection terminal and the adjustable delay time terminal respectively.

While the invention has been described by means of a specification with accompanying drawings of specific embodiments, numerous modifications and variations could be made thereto by those skilled in the art without departing from the scope and spirit of the invention set forth in the claims.

What is claimed is:

1. An over-power protection apparatus with programmable over-current threshold for a power converter, comprising:
    an oscillator, generating a pulse signal;
    a control unit, generating a clear signal in response to a current sense signal, a voltage feedback signal and a maximum power threshold of said power converter;
    a driving unit, connected to said oscillator and said control unit for generating a driving signal in response to said pulse signal and said clear signal;
    a threshold unit, connected to said driving unit for generating a current limit signal as said driving signal is in high-level;
    an over-power comparative unit, connected to said threshold unit for comparing said current limit signal and said current sense signal to generate a protection signal as said current sense signal is higher than said current limit signal;
    an accumulating trigger unit, connected to said over-power comparative unit and said oscillator for receiving said protection signal and said pulse signal, wherein said accumulating trigger unit accumulates and counts said protection signal, and further generates a first off-signal as said protection signal is enabled and the count of said protection signal reaches a predetermined value; and
    a latch unit, connected to said accumulating trigger unit and said driving unit for generating a latch signal to said driving unit in response to said first off-signal;
    wherein said driving unit latch-off said driving signal in response to said latch signal and adjusts a pulse width of said driving signal in response to said clear signal outputted by said control unit.

2. The over-power protection apparatus with programmable over-current threshold of claim 1, wherein said accumulating trigger unit comprising:
    a holding unit, connected to said over-power comparative unit and said oscillator for generating an up-down signal to delay the state of said protection signal in accordance with said protection signal and said pulse signal;
    a switch, connected to said holding unit for generating an on/off state in response to said up-down signal and the states of said protection signal;
    a programmable capacitor, connected to a charging current source via said switch for generating a charging current and a charging voltage in response to the on state of said switch, wherein said programmable capacitor further connects to a discharging current source via said switch, said discharging current source generates a discharging current to discharge said programmable capacitor in response to the off state of said switch; and
    a delay comparator, connected to said programmable capacitor and a fourth threshold signal, which comparing said charging voltage with said fourth threshold signal for generating said first off-signal as said charging voltage is higher than said fourth threshold signal;
    wherein said predetermined value of said accumulating trigger unit can be adjusted by said programmable capacitor.

3. The over-power protection apparatus with programmable over-current threshold of claim 1, wherein said threshold unit comprises a constant current source, a first controlled switch and a programmable resistor, wherein said constant current source connects to said programmable resistor via said first controlled switch, further, said first controlled switch is at on state as said driving signal is in high-level, and said constant current source follows through said programmable resistor for generating said current limit signal.

4. The over-power protection apparatus with programmable over-current threshold of claim 1, wherein the magnitude of said current limit signal can be adjusted by said programmable resistor.

5. The over-power protection apparatus with programmable over-current threshold of claim 1, further comprising a voltage feedback terminal, a current sense terminal, a voltage input terminal, a driving terminal, an over-power/over-temperature protection terminal and an adjustable delay time terminal.

6. An over-power protection apparatus with programmable over-current threshold for a power converter, comprising:
- an oscillator, generating a pulse signal;
- a control unit, generating a clear signal in response to a current sense signal, a voltage feedback signal and a maximum power threshold of said power converter;
- a driving unit, connected to said oscillator and said control unit for generating a driving signal in response to said pulse signal and said clear signal;
- a threshold unit, connected to said driving unit for generating a current limit signal as said driving signal is in high-level;
- an over-temperature protection unit, connected to said driving unit for receiving an over-temperature threshold to generate a second off-signal in response to a thermal limit signal is lower than said over-temperature threshold and said driving signal is in low-level;
- an over-power comparative unit, connected to said threshold unit for comparing said current limit signal and said current sense signal to generate a protection signal as said current sense signal is higher than said current limit signal;
- an accumulating trigger unit, connected to said over-power comparative unit and said oscillator for receiving said protection signal and said pulse signal, wherein said accumulating trigger unit accumulates and counts said protection signal, and further generates a first off-signal as said protection signal is enabled and the count of said protection signal reaches a predetermined value; and
- a connecting unit, connected to said over-temperature protection unit and said accumulating trigger unit for executing an or-gate operation and generating a third off-signal in response to said second off-signal and said first off-signal; and
- a latch unit, connected to said connecting unit and said driving unit for generating a latch signal to said driving unit in response to said third off-signal;
- wherein said driving unit latch-off said driving signal in response to said latch signal and adjusts a pulse width of said driving signal in response to said clear signal of said control unit.

7. The over-power protection apparatus with programmable over-current threshold of claim 6, wherein said over-temperature protection unit comprising:
- a thermal sensor, connected to said driving unit and a ground via a threshold diode and a programming resistor of said threshold unit;
- an over-temperature current source, connected to said programming resistor via a second controlled switch, wherein said second controlled switch connects to said driving unit via an inverter; and
- an over-temperature comparator, connected to said programmable resistor, said over-temperature comparator comparing said over-temperature threshold with said thermal limit signal across said programmable resistor, said over-temperature comparator further connected to said connecting unit via a third controlled switch, wherein said third controlled switch connects to said driving unit via said inverter;

whereby said threshold diode, said second and said third controlled switches are turned on in response to said driving signal of said driving unit is in low-level, and said over-temperature comparator generates said second off-signal as said thermal limit signal is lower than said over-temperature threshold.

8. The over-power protection apparatus with programmable over-current threshold of claim 6, wherein said accumulating trigger unit comprising:
- a holding unit, connected to said over-power comparative unit and said oscillator for generating an up-down signal to delay the state of said protection signal in accordance with said protection signal and said pulse signal;
- a switch, connected to said holding unit for generating an on/off state in response to said up-down signal and the states of said protection signal;
- a programmable capacitor, connected to a charging current source via said switch for generating a charging current and a charging voltage in response to the on state of said switch, wherein said programmable capacitor further connects to a discharging current source via said switch, said discharging current source generates a discharging current to discharge said programmable capacitor in response to the off state of said switch; and
- a delay comparator, connected to said programmable capacitor and a fourth threshold signal, said delay comparator comparing said charging voltage with said fourth threshold signal for generating said first off-signal as said charging voltage is higher than said fourth threshold signal;
- wherein said predetermined value of said accumulating trigger unit can be adjusted by said programmable capacitor.

9. The over-power protection apparatus with programmable over-current threshold of claim 6, wherein said threshold unit comprises a constant current source, a first controlled switch, a programmable resistor and a fourth controlled switch, wherein said constant current source connects with said programmable resistor via said first controlled switch, further, said first and said fourth controlled switches are turned on as said driving signal is in high-level, and said constant current source follows through said programmable resistor for generating said current limit signal.

10. The over-power protection apparatus with programmable over-current threshold of claim 6, wherein the magnitude of said current limit signal and said thermal limit signal can be adjusted by said programmable resistor.

11. The over-power protection apparatus with programmable over-current threshold of claim 6, further comprising a voltage feedback terminal, a current sense terminal, a voltage input terminal, a driving terminal, an over-power/over-temperature protection terminal and an adjustable delay time terminal.

* * * * *